US008135698B2

(12) United States Patent
Dettinger et al.

(10) Patent No.: US 8,135,698 B2
(45) Date of Patent: Mar. 13, 2012

(54) TECHNIQUES FOR REPRESENTING RELATIONSHIPS BETWEEN QUERIES

(75) Inventors: Richard D. Dettinger, Rochester, MN (US); Daniel P. Kolz, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 10/877,230

(22) Filed: Jun. 25, 2004

(65) Prior Publication Data
US 2005/0289100 A1 Dec. 29, 2005

(51) Int. Cl.
*G06F 7/00* (2006.01)
*G06F 17/30* (2006.01)
(52) U.S. Cl. ......... 707/708; 707/736; 707/798; 707/805
(58) Field of Classification Search .................. None
See application file for complete search history.

(56) References Cited

U.S. PATENT DOCUMENTS

| 5,515,488 | A   | * | 5/1996  | Hoppe et al. ............... 345/440 |
| 6,003,034 | A   |   | 12/1999 | Tuli |
| 6,326,962 | B1  | * | 12/2001 | Szabo ........................ 715/762 |
| 6,363,377 | B1  | * | 3/2002  | Kravets et al. ................ 707/4 |
| 6,725,227 | B1  |   | 4/2004  | Li |
| 6,785,668 | B1  | * | 8/2004  | Polo et al. ..................... 707/2 |
| 6,925,494 | B1  |   | 8/2005  | Nisbet |
| 6,938,034 | B1  | * | 8/2005  | Kraft et al. .................... 707/3 |
| 6,996,558 | B2  |   | 2/2006  | Dettinger et al. |
| 7,565,627 | B2  | * | 7/2009  | Brill et al. ................... 715/854 |
| 7,831,559 | B1  | * | 11/2010 | Mohan et al. ................ 707/638 |
| 2003/0195878 | A1 | * | 10/2003 | Neumann ..................... 707/3 |
| 2004/0215648 | A1 | * | 10/2004 | Marshall et al. ............. 707/102 |
| 2005/0222981 | A1 | * | 10/2005 | Lawrence et al. .............. 707/3 |
| 2005/0256833 | A1 | * | 11/2005 | Zeng et al. .................... 707/1 |
| 2005/0273453 | A1 | * | 12/2005 | Holloran ........................ 707/1 |
| 2005/0283466 | A1 |   | 12/2005 | Dettinger et al. |
| 2006/0074883 | A1 | * | 4/2006  | Teevan et al. .................. 707/3 |
| 2006/0149720 | A1 | * | 7/2006  | Dehlinger ...................... 707/3 |
| 2007/0168344 | A1 | * | 7/2007  | Brinson et al. ................. 707/5 |

OTHER PUBLICATIONS

Steve Jones, "Graphical Query Specification and Dynamic Result Previews for a Digital Library", UIST '98, San Francisco; 1998 ACM 0-58113-034-1/98/11; Department of Computer Science, University of Waikato, Private Bag 3105; Hamilton, New Zealand; p. 144, col. 1—p. 149, col. 2.*
Office Action History of U.S. Appl. No. 10/870,379, dates ranging from Aug. 14, 2006 to Oct. 2, 2007.
BPAI Decision dated Jul. 7, 2010 for U.S. Appl. No. 10/870,379.

* cited by examiner

*Primary Examiner* — Rehana Perveen
*Assistant Examiner* — Raheem Hoffler
(74) *Attorney, Agent, or Firm* — Patterson & Sheridan LLP

(57) ABSTRACT

A method, system and article of manufacture for processing queries and, more particularly, for graphically representing relationships between different queries. One embodiment provides a method for graphically representing a relationship between a first and a second query. The method includes selecting, from the first and second queries, elements to be compared. On the basis of the selected elements, a degree of similarity between the first and second queries is calculated. The method further includes displaying a first query object representative of the first query and a second query object representative of the second query in a user interface. The first and second query objects are positionally arranged on the basis of the calculated degree of similarity. The positional arrangement reflects the relationship between the first and second queries.

34 Claims, 7 Drawing Sheets

TECHNIQUES FOR REPRESENTING RELATIONSHIPS BETWEEN QUERIES

BACKGROUND OF THE INVENTION

1. Field of the Invention

The present invention generally relates to query processing and, more particularly, to graphically representing relationships between different queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations. Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Any requesting entity, including applications, operating systems and, at the highest level, users, can issue queries against data in a database. Queries may be predefined (i.e., hard coded as part of an application) or may be generated in response to input (e.g., user input). A given requesting entity may execute a multiplicity of different queries. Upon execution of each query against a database, a corresponding query result is returned to the requesting entity.

Any executed query and corresponding query result(s) can be stored persistently. Thus, for instance, a user may frequently execute a given query to determine whether new records have been stored in the database(s) since a previous execution of the given query. Assume now that the user would like to compare different stored queries and/or different stored query results. For instance, assume that the user wants to merge results of two different statistical analyses which have been performed on a given database into an overall analysis result. Each of the two analysis results consists of a given set of queries, which have been executed against the given database, and corresponding query results. Thus, to merge the two different analysis results the user needs to identify similarities between both sets of queries and/or query results. In order to identify such similarities, the user must compare both sets of queries and/or query results manually. This is, however, cumbersome and inefficient for the user. Furthermore, in the case of complex queries, analyzing the query conditions and result fields of different queries to understand the mechanisms of the query conditions to identify similarities is a particularly tedious process.

Therefore, there is a need for an efficient technique for identifying similarities between different queries and/or query results.

SUMMARY OF THE INVENTION

The present invention is generally directed to a method, system and article of manufacture for processing queries and, more particularly, for graphically representing relationships between different queries and/or between different query results.

One embodiment provides a method for graphically representing a relationship between a first and a second query. The method comprises selecting one or more elements from the first and second queries. On the basis of the selected elements, a degree of similarity between the first and second queries is calculated. Then, a first query object representative of the first query and a second query object representative of the second query are displayed in a user interface. The first and second query objects are positionally arranged on the basis of the calculated degree of similarity. The positional arrangement reflects the relationship between the first and second queries.

Another embodiment of a method for graphically representing relationships between a first result obtained upon execution of a first query and a second result obtained upon execution of a second query. The method comprises comparing the first and second results to determine matching elements of the first and second results. Then, at least a first graphical object representative of the first result and a second graphical object representative of the second result are displayed in a user interface. The graphical objects are positionally related on the basis of the determined matching elements, wherein the positional relationship of the graphical objects reflects a degree of similarity between the first result and second result.

Still another embodiment of a method for graphically representing a relationship between a first and a second query result. The method comprises displaying, in a user interface, at least a first graphical object representative of a first result of a first query and a second graphical object representative of a second result of a second query. Each of the graphical objects is positionally related so that respective portions of the graphical objects are overlapping one another, whereby a plurality of user-selectable regions is defined comprising (i) an overlapping region defined by the overlapping respective portions and (ii) non-overlapping regions defined by the non-overlapping portions of the graphical objects. Each user-selectable region corresponds to a different executable query. Then, user-selection of a user-selectable region of the plurality of user-selectable regions is received and the first query, the second query and an executable query corresponding to the user-selected region are executed to obtain corresponding query results. On the basis of the obtained query results, the positionally related graphical objects are re-arranged.

Still another embodiment provides a computer-readable medium containing a program which, when executed by a processor, performs a process for graphically representing a relationship between a first and a second query. The process comprises selecting one or more elements from the first and second queries. On the basis of the selected elements, a degree of similarity between the first and second queries is calculated. Then, a first query object representative of the first query and a second query object representative of the second query are displayed in a user interface. The first and second query objects are positionally arranged on the basis of the calculated degree of similarity. The positional arrangement reflects the relationship between the first and second queries.

Still another embodiment provides a computer-readable medium containing a program which, when executed by a processor, performs another process for graphically representing relationships between a first result obtained upon execution of a first query and a second result obtained upon execution of a second query. The process comprises comparing the first and second results to determine matching elements of the first and second results. Then, at least a first graphical object representative of the first result and a second graphical object representative of the second result are displayed in a user interface. The graphical objects are positionally related on the basis of the determined matching elements, wherein the positional relationship of the graphical objects reflects a degree of similarity between the first result and second result.

Still another embodiment provides a computer-readable medium containing a program which, when executed by a processor, performs another process for graphically representing a relationship between a first and a second query result. The process comprises displaying, in a user interface, at least a first graphical object representative of a first result of a first query and a second graphical object representative of a second result of a second query. Each of the graphical objects is positionally related so that respective portions of the graphical objects are overlapping one another, whereby a plurality of user-selectable regions is defined comprising (i) an overlapping region defined by the overlapping respective portions and (ii) non-overlapping regions defined by the non-overlapping portions of the graphical objects. Each user-selectable region corresponds to a different executable query. Then, user-selection of a user-selectable region of the plurality of user-selectable regions is received and the first query, the second query and an executable query corresponding to the user-selected region are executed to obtain corresponding query results. On the basis of the obtained query results, the positionally related graphical objects are re-arranged.

Still another embodiment provides a computer system comprising a user interface, a first and a second query, and a relationship manager. The relationship manager is configured for selecting one or more elements from the first and second queries. On the basis of the selected elements, a degree of similarity between the first and second queries is calculated. The relationship manager is further configured for displaying a first query object representative of the first query and a second query object representative of the second query in the user interface. The first and second query objects are positionally arranged on the basis of the calculated degree of similarity. The positional arrangement reflects the relationship between the first and second queries.

Still another embodiment provides a computer system comprising a user interface, a query manager and a relationship manager. The query manager is configured for executing a first query for obtaining a first result and a second query for obtaining a second result. The relationship manager is configured for comparing the first and second results to determine matching elements of the first and second results, and displaying, in the user interface, at least a first graphical object representative of the first result and a second graphical object representative of the second result. The graphical objects are positionally related on the basis of the determined matching elements, wherein the positional relationship of the graphical objects reflects a degree of similarity between the first result and second result.

Still another embodiment provides a computer system comprising a user interface, a first and a second query result, a relationship manager and a query manager. The relationship manager is configured for displaying, in the user interface, at least a first graphical object representative of the first query result and a second graphical object representative of the second query result. Each of the graphical objects is positionally related so that respective portions of the graphical objects are overlapping one another, whereby a plurality of user-selectable regions is defined comprising (i) an overlapping region defined by the overlapping respective portions and (ii) non-overlapping regions defined by the non-overlapping portions of the graphical objects. Each user-selectable region corresponds to a different executable query. The relationship manager is further configured for receiving, via the user interface, user-selection of a user-selectable region of the plurality of user-selectable regions, and initiating execution of: (i) a first query corresponding to the first query result, (ii) a second query corresponding to the second query result, and (iii) an executable query corresponding to the user-selected region, to obtain corresponding query results. The positionally related graphical objects are then re-arranged on the basis of the obtained query results. The query manager is configured for executing the first query, the second query and the executable query corresponding to the user-selected region.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
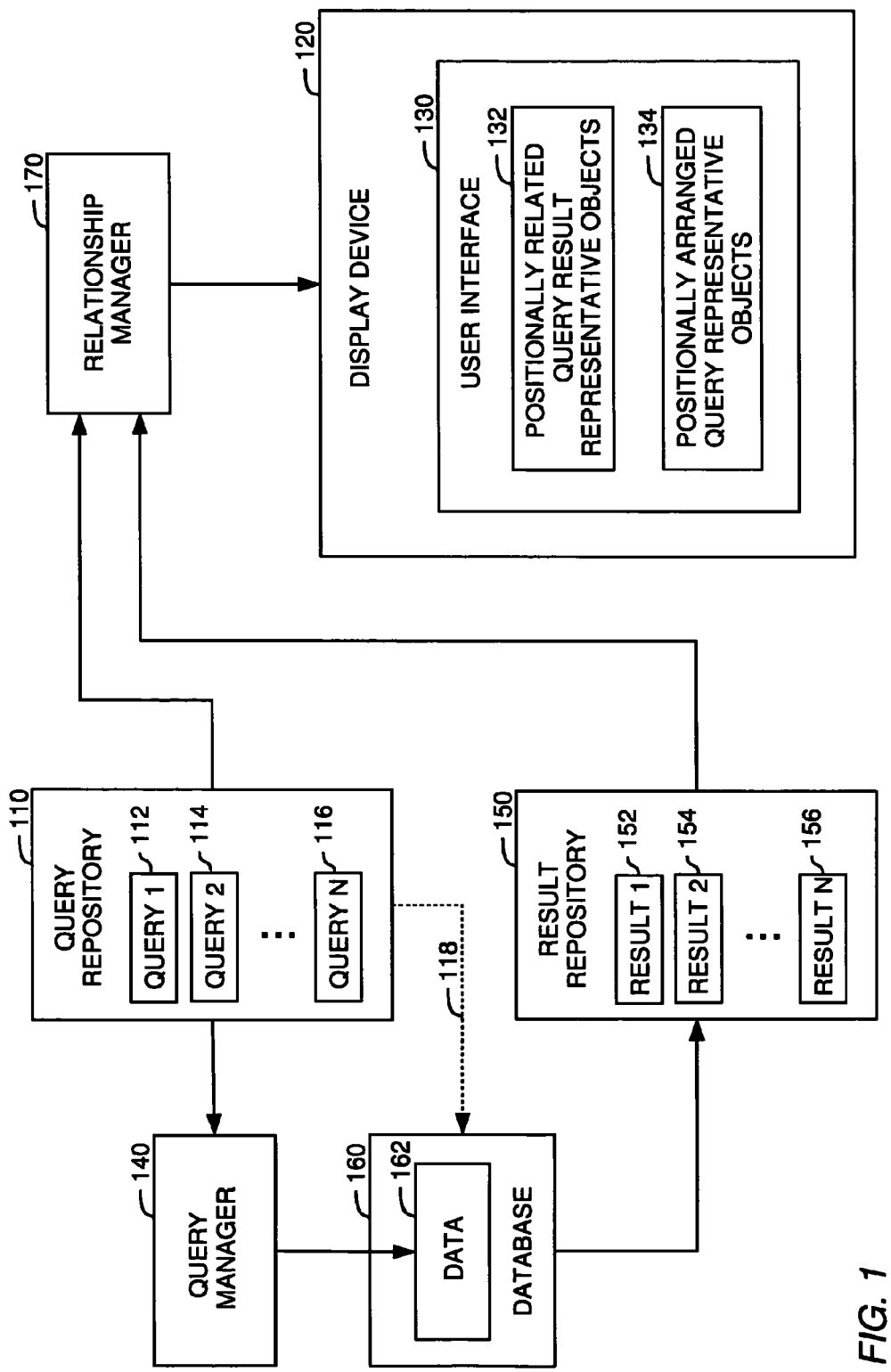
FIG. 1 is a relational view of software components in one embodiment.

The present invention is generally directed to a method, system and article of manufacture for query processing and, more particularly, for graphically representing relationships between different queries. According to one aspect, relationships between different queries can be represented with respect to the different queries themselves and/or with respect to corresponding query results. In other words, the relationships can be determined by comparing the different queries with each other and/or by comparing corresponding query results with each other.

In one embodiment, a relationship between a first and a second query is graphically represented. The relationship is identified by comparing the first and second queries. More specifically, elements to be compared are selected from the first and second queries. According to one aspect, such elements are one or more of (i) condition fields of query conditions from the first and second queries, (ii) condition parameters of query conditions from the first and second queries, and (iii) result fields of the first and second queries. On the basis of the selected elements, a degree of similarity between the first and second queries can be calculated by comparing the selected elements. Then, a first query object representative of the first query and a second query object representative of the second query are displayed in a user interface. The first and second query objects are positionally arranged on the basis of the calculated degree of similarity. Thus, the positional arrangement reflects the relationship between the first and second queries.

In another embodiment, relationships between a first result obtained upon execution of a first query and a second result obtained upon execution of a second query are graphically represented. To this end, the first and second results are compared to determine matching elements of the first and second results. Then, at least a first graphical object representative of the first result and a second graphical object representative of the second result are displayed in a user interface. The graphical objects are positionally related on the basis of the determined matching elements. More specifically, according to one aspect respective portions of the graphical objects are overlapping one another if one or more matching elements are determined. In this case, a plurality of regions is defined comprising (i) an overlapping region defined by the overlapping respective portions and (ii) non-overlapping regions defined by the non-overlapping portions of the graphical objects. In other words, the overlapping region graphically represents the determined matching elements. Accordingly, if no matching element is determined, the graphical objects are graphically represented in a non-overlapping manner.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of software components in one embodiment is illustrated. The software components illustratively include a query repository 110, a user interface 130, a query manager 140, a query result repository 150, a database 160 and a relationship manager 170. According to one aspect, the user interface 130 is configured for graphically representing relationships between different queries and/or between different query results. An exemplary method for graphically representing relationships between different queries using the user interface 130 is described below with reference to FIG. 2. An exemplary method for graphically representing relationships between different query results using the user interface 130 is described below with reference to FIG. 4.

Illustratively, the query repository 110 includes a plurality of previously defined queries 112, 114 and 116. The queries 112, 114 and 116 may have been created by different applications or in response to input (e.g., user input). However, providing the query repository 110 with the previously defined queries 112, 114 and 116 is merely illustrative and not intended to limit the invention accordingly. Instead, the previously defined queries 112, 114 and 116 may be provided separately from each other and stored individually at different locations in a corresponding data processing system. Furthermore, in one embodiment the queries 112, 114 and 116 are not predefined in the sense of being persistent objects in the query repository 110, but are instead composed and displayed in the user interface 130 during a given user session.

The queries 112, 114 and 116 are defined for execution against data 162 in the database 160, as illustrated by dashed arrow 118. The database 160 is representative of any collection of data regardless of the particular physical representation. For example, the data 162 may represent tables (and their respective contents) defined by columns and rows. By way of illustration, the database 160 may be organized according to a relational schema (accessible by SQL queries) or according to an XML schema (accessible by XML queries). However, the invention is not limited to a particular physical representation or schema and contemplates extension to schemas presently unknown. As used herein, the term "schema" generically refers to a particular arrangement of the data 162.

According to one aspect, the queries 112, 114 and 116 are abstract queries. An abstract query is composed using logical fields defined by a data abstraction model. Each logical field is mapped to one or more physical entities of data of an underlying data representation being used in the database 160 (e.g., XML, SQL, or other type of representation). Furthermore, in the data abstraction model the logical fields are defined independently from the underlying data representation, thereby allowing queries to be formed that are loosely coupled to the underlying data representation. The abstract query can be configured to access the data 162 and return query results, or to modify (i.e., insert, delete or update) the data 162. For execution against the data 162, the abstract query is transformed into a form (referred to herein as concrete query) consistent with the underlying data representation of the data 162. Transformation of abstract queries into concrete queries is described in detail in the commonly owned, co-pending U.S. patent application Ser. No. 10/083,075, entitled "Application Portability And Extensibility Through Database Schema And Query Abstraction," filed Feb. 26, 2002, which is incorporated by reference in its entirety.

Upon execution of the queries 112, 114 and 116 against the database 160, query results 152, 154 and 156 are obtained, respectively. Illustratively, the query results 152, 154 and 156 are stored as persistent objects in the query result repository 150. However, providing the query result repository 150 with the obtained query results 152, 154 and 156 is merely illustrative and not intended to limit the invention accordingly. Instead, the obtained query results 152, 154 and 156 may be obtained by different applications and stored individually at different locations in a corresponding data processing system. In one embodiment, the query results 152, 154 and 156 are determined during a given user session and subsequently cached.

In one embodiment, the user interface 130 is displayed on a display device 120 and includes at least one of (i) a query relationship representation display area 134 (hereinafter referred to as "query area", for brevity) for displaying positionally arranged query representative objects, and (ii) a result relationship representation display area 132 (hereinafter referred to as "result area", for brevity) for displaying positionally related query result representative objects. More specifically, the query area 134 displays query objects which are representative of different queries. The query objects are positionally arranged in the query area 134 on the basis of a calculated degree of similarity between the different queries. The positional arrangement reflects the relationships between the different queries. An exemplary user interface for graphically displaying relationships between different queries is described below with reference to FIG. 3. The result area 132 displays graphical objects representative of different query results. The graphical objects are positionally related on the basis of matching elements contained in the different query results for illustrating presence/absence of such matching elements. In other words, the positional relations reflect the relationships between the different query results. Exemplary user interfaces for graphically displaying relationships between different query results are described below with reference to FIGS. 5A-5B.

Using the user interface 130, a user can interact with at least a portion of the illustrated software components. For instance, the user can use the user interface 130 to create one or more of the queries 112, 114 and 116. Furthermore, the user can use the user interface 130 to select different queries from the query repository 110 and/or different query results from the result repository 150 and instruct the relationship manager 170 to determine and graphically represent a relationship(s) between the selected queries and/or query results. Selection and determination of different queries is described below with reference to FIGS. 6-12. Determination of relationships between different queries and/or different query results and graphically representing the determined relationships using the user interface 130 and the relationship manager 170 is explained in more detail below with reference to FIGS. 2-5B.

Figure 2:
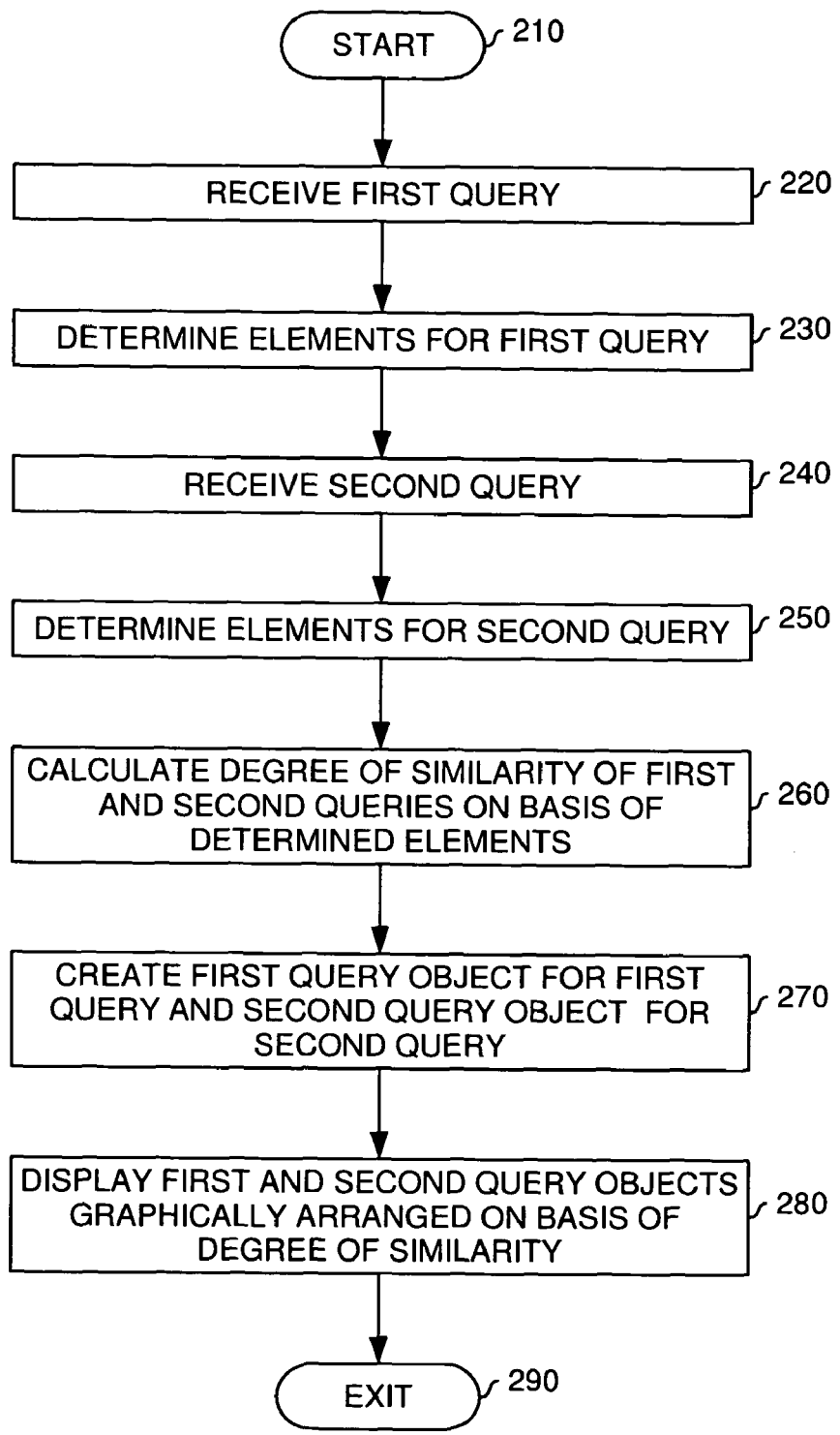
FIG. 2 is a flow chart illustrating a method for graphically representing relationships between different queries in one embodiment.

Referring now to FIG. 2, one embodiment of a method 200 for graphically representing a relationship between different queries is shown. At least part of the steps of method 200 can be performed using a relationship manager (e.g., relationship manager 170 of FIG. 1), a query manager (e.g., query manager 140 of FIG. 1) and/or a user interface (e.g., user interface 130 of FIG. 1). Method 200 starts at step 210.

At step 220, the relationship manager receives a first query (e.g., query 112 of FIG. 1). According to one aspect, the first query can be created by a user using the user interface. According to another aspect, the first query can be created using previously defined queries. An exemplary method for creating a query using previously defined queries is described below with reference to FIGS. 6-12. According to still another aspect, the user may select the first query from a query repository (e.g., query repository 110 of FIG. 1) using the user interface. The first query is then transmitted to the relationship manager.

In one embodiment, the received query is an SQL query. One of the most commonly executed SQL queries is the SELECT statement. The SELECT statement generally has the format: "SELECT<clause> FROM<clause>WHERE<clause> GROUP BY<clause> HAVING<clause> ORDER BY <clause>". The clauses must generally follow this sequence. Only the SELECT and FROM clauses are required and all other clauses are optional. The result of a SELECT statement is, in general, a subset of data retrieved from one or more existing tables (e.g., data 162 of FIG. 1) stored in a relational database (e.g., database 160 of FIG. 1), wherein the FROM clause identifies the name of the table or tables from which the data is being selected. The subset of data is treated as a new table, termed the result table. The WHERE clause determines which rows should be returned in the result table. Generally, the WHERE clause contains one or more query conditions that must be satisfied by each row returned in the result table. The query condition(s) are typically one or more predicates, each of which specifies a comparison between two values from certain columns, constants or correlated values using suitable comparison operators, such as "=", ">" and "<". Multiple predicates in the WHERE clause are typically connected by Boolean operators, such as Boolean AND and/or OR operators.

At step 230, the relationship manager selects elements from the first query which are to be compared to corresponding elements of a second query. In one embodiment, such elements include one or more of (i) condition fields of query conditions from the first query, (ii) condition parameters of query conditions from the first query, and (iii) result fields of the first query. According to one aspect, the condition fields are columns contained in the query condition(s) of the first query. The condition parameters generally include: (i) comparison operators, and (ii) values which are compared to values in the condition fields using the comparison operators. The result fields of the first query are columns for which information is to be returned upon execution of the first query. The columns which define the condition fields and the result fields correspond to columns in one or more underlying database tables.

An illustrative SQL query exemplifying the first query ("QUERY 1") is shown in Table I below. By way of illustration, the exemplary query is defined using SQL. However, any other language may be used to advantage.

TABLE I

EXEMPLARY SQL "QUERY 1"

| | |
|---|---|
| 001 | SELECT PID, Name, Age, Gender |
| 002 | FROM Demographic |
| 003 | WHERE (Age > 50 AND |
| 004 | PID = 1004) |

By way of example, the exemplary SQL query of Table I is defined to select information from "PID", "Name" "Age" and "Gender" columns (line 001) of a database table "Demographic" (line 002) for individuals having an Age ("Age>50") of 50 years and more (line 003) and an associated identifier "PID" equal to "1004" (line 004). In other words, the exemplary SQL query of Table I includes as result fields "PID", "Name" "Age" and "Gender" (line 001). Furthermore, the exemplary SQL query of Table I includes two query conditions (lines 003-004) having as condition fields "Age" and "PID" and as condition parameters: (i) comparison operators ">" (line 003) and "=" (line 004), and (ii) constant values "50" (line 003) and "1004" (line 004).

At step 240, the relationship manager receives the second query (e.g., query 114 of FIG. 1). The second query can be created or selected in a manner that is similar to creation or selection of the first query as described above with reference to step 220. At step 250, the relationship manager selects elements from the second query which are used to be compared to the elements which have been selected at step 230 for the first query.

An illustrative SQL query exemplifying the second query ("QUERY 2") is shown in Table II below. By way of illustration, the exemplary query is defined using SQL. However, any other language may be used to advantage.

TABLE II

EXEMPLARY SQL "QUERY 2"

| | |
|---|---|
| 001 | SELECT PID, Name, Age, Gender |
| 002 | FROM Demographic |
| 003 | WHERE (Gender = 'M' AND |
| 004 | PID = 1004) |

By way of example, the exemplary SQL query of Table II is defined to select information from "PID", "Name", "Age" and "Gender" columns (line 001) of the database table "Demographic" (line 002) for individuals having as gender ("Gender") 'M', i.e., male (line 003), and an associated identifier "PID" equal to "1004" (line 004). In other words, the exemplary SQL query of Table II includes as result fields "PID", "Name" "Age" and "Gender" (line 001). Furthermore, the exemplary SQL query of Table II includes two query conditions (lines 003-004) having as condition fields "Gender" and "PID" and as condition parameters: (i) comparison operators "=" (line 003) and "=" (line 004), and (ii) constant values 'M' (line 003) and "1004" (line 004).

At step 260, a degree of similarity between the first and second queries is calculated on the basis of the selected elements. To this end, at least a portion of the selected elements of the first query is compared to corresponding selected elements of the second query.

In one embodiment, only one type of element is used for comparison. For instance, only the condition fields of the first and second queries are compared with each other. Accordingly, all condition fields included in only one of either of the first and second queries are counted. The number of non-matching condition fields can then be used as an indicator of a degree of difference, and conversely, as the degree of similarity between the first and second queries. More specifically, if no condition field is included only in either of the first and second queries, all conditions fields contained in the first query are contained in the second query and vice versa. Accordingly, the first and second queries contain query conditions having only matching condition fields. Thus, a high degree of similarity can be associated with both queries. However, the more condition fields are only included in either of the first and second queries, the less the query conditions of the first and second queries are similar. Thus, according to one aspect, the degree of similarity can be decreased for each condition field which is contained only in either of the first and second queries.

In the given example of the exemplary SQL queries of Tables I and II, the first query has the condition fields "Age" and "PID" (lines 003-004 of Table I) and the second query has the condition fields "Gender" and "PID" (lines 003-004 of Table II). As each query has a condition field that is not contained in the other query, there are two non-matching condition fields. However, it should be noted that comparing the condition fields and counting non-matching and/or matching condition fields is merely described by way of example. Instead, any suitable selected elements can be compared, such as result fields, whereby non-matching and/or matching elements are counted. Furthermore, as was noted above, different types of elements may respectively be compared with each other. For instance, the condition fields and the condition parameters are respectively compared with each other. In this case, each type of element can be weighted prior to being compared. By way of example, weighting can be performed using predefined weights which may be user-specific or application-specific, dynamically calculated weights or statistically inferred weights. Weighting the different types of elements can be used to associate a relative importance with each type of element. For instance, the conditions fields in the query conditions of the first and second queries are weighted with a factor "2" and the condition parameters are weighted with a factor "1". Accordingly, the condition fields have a higher relative importance than the condition parameters. Furthermore, the different types of elements can be compared in a predefined sequence, which can be user-specific or application-specific. For instance, at the beginning of comparison the condition fields can be compared. Then, according to one aspect, corresponding condition parameters can be compared. In one embodiment, the corresponding condition parameters are only compared for matching condition fields. Furthermore, comparison operators can be compared before comparing associated values. However, it should be noted that various algorithms can be developed for determining the degree of similarity, which are all broadly contemplated.

At step 270, a first query object representative of the first query and a second query object representative of the second query are created. At step 280, the first and second query objects are displayed in the user interface. The first and second query objects are positionally arranged in the user interface on the basis of the calculated degree of similarity. The positional arrangement reflects the relationship between the first and second queries. Method 200 then exits at step 290.

Figure 3:
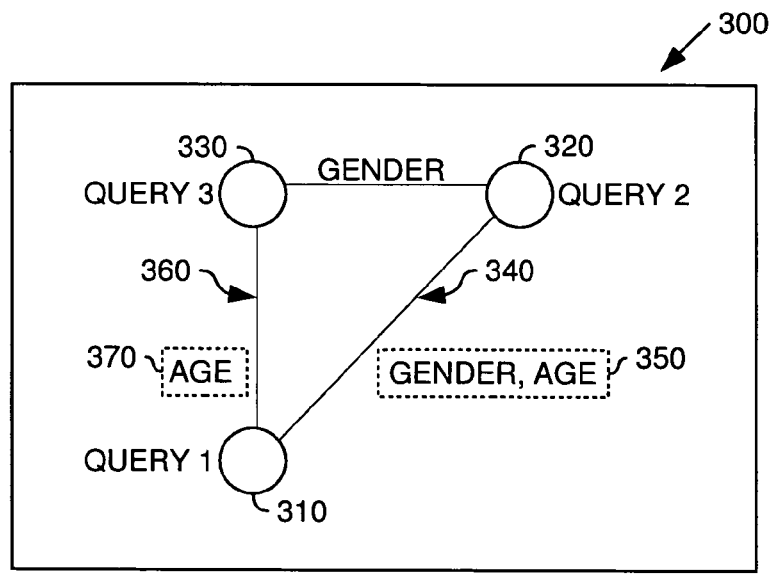
FIG. 3 is an illustrative user interface for graphically displaying relationships between different queries in one embodiment.

An exemplary user interface 300 (e.g., query area 134 of user interface 130 of FIG. 1) displaying positionally arranged query objects is described with reference to FIG. 3. The user interface 300 illustratively includes three query objects 310-330. The query objects 310-330 are represented as circles. However, it should be noted that the query objects can be represented using any suitable shapes, including other geometrical shapes such as rectangles and polygons. By way of example, the first query object 310 is representative of "QUERY 1" of Table I and the second query object 320 is representative of "QUERY 2" of Table II. The third query object 330 is representative of a third query ("QUERY 3") described in Table III below. By way of illustration, the exemplary query "QUERY 3" is defined using SQL. However, any other language may be used to advantage.

TABLE III

EXEMPLARY SQL "QUERY 3"

| | |
|---|---|
| 001 | SELECT PID, Name, Age, Gender |
| 002 | FROM Demographic |
| 003 | WHERE PID = 1004 |

By way of example, the exemplary SQL query of Table III is defined to select information from "PID", "Name", "Age" and "Gender" columns (line 001) of the database table "Demographic" (line 002) for individuals having an associated identifier "PID" equal to "1004" (line 003). In other words, the exemplary SQL query of Table III includes as result fields "PID", "Name" "Age" and "Gender" (line 001). Furthermore, the exemplary SQL query of Table III includes a single query condition (line 003) having as condition field "PID" and as condition parameter: (i) comparison operator "=", and (ii) constant value "1004".

In one embodiment, the displayed query objects 310-330 are connected to each other via a graphical connector object (connector). A given connector can be indicative of a degree of similarity between two different queries associated with the query objects which are connected via the given connector. To this end, the given connector can be displayed in the user interface such that the two query objects have a relative distance. The relative distance is indicative of the degree of similarity, i.e., the shorter the connector is, the closer the two query objects and, thus, the two different queries are. Furthermore, in one embodiment the given connector describes for one or more corresponding selected elements at least one of: (i) a number of matching selected elements contained in the two different queries, and (ii) a number of non-matching selected elements contained only in either of the two different queries. In the exemplary user interface 300, the first query object 310 is connected by way of example to the second query object 320 via a first connector 340. The first query object 310 is further connected, via a second connector 360, to the third query object 330. Illustratively, the first connector 340 is shown longer than the second connector 360. This length difference indicates that the degree of similarity is relatively higher between the first query ("QUERY 1" of Table I) and the third query ("QUERY 3" of Table II) than between the first and the second query ("QUERY 2" of Table II). Furthermore, the first connector 340 is associated with an illustrative tag 350 describing non-matching condition fields between the first and the third query and the second connector 360 is associated with an illustrative tag 370. Specifically, the illustrative tag 350 indicates that the condition fields "Gender" and "Age" are only included in either of the first and second queries.

As was noted above, relationships between different queries can be represented with respect to the different queries themselves or with respect to corresponding query results. Graphically representing a relationship between different queries has been described above with reference to FIGS. 2-3. By way of example, FIG. 3 has been described with respect to a two-dimensional representation of the relationship. However, it should be noted that any suitable graphical representation is broadly contemplated, such as a three-dimensional representation. Graphically representing relationships between different query results is described below with reference to FIGS. 4-5B.

Figure 4:
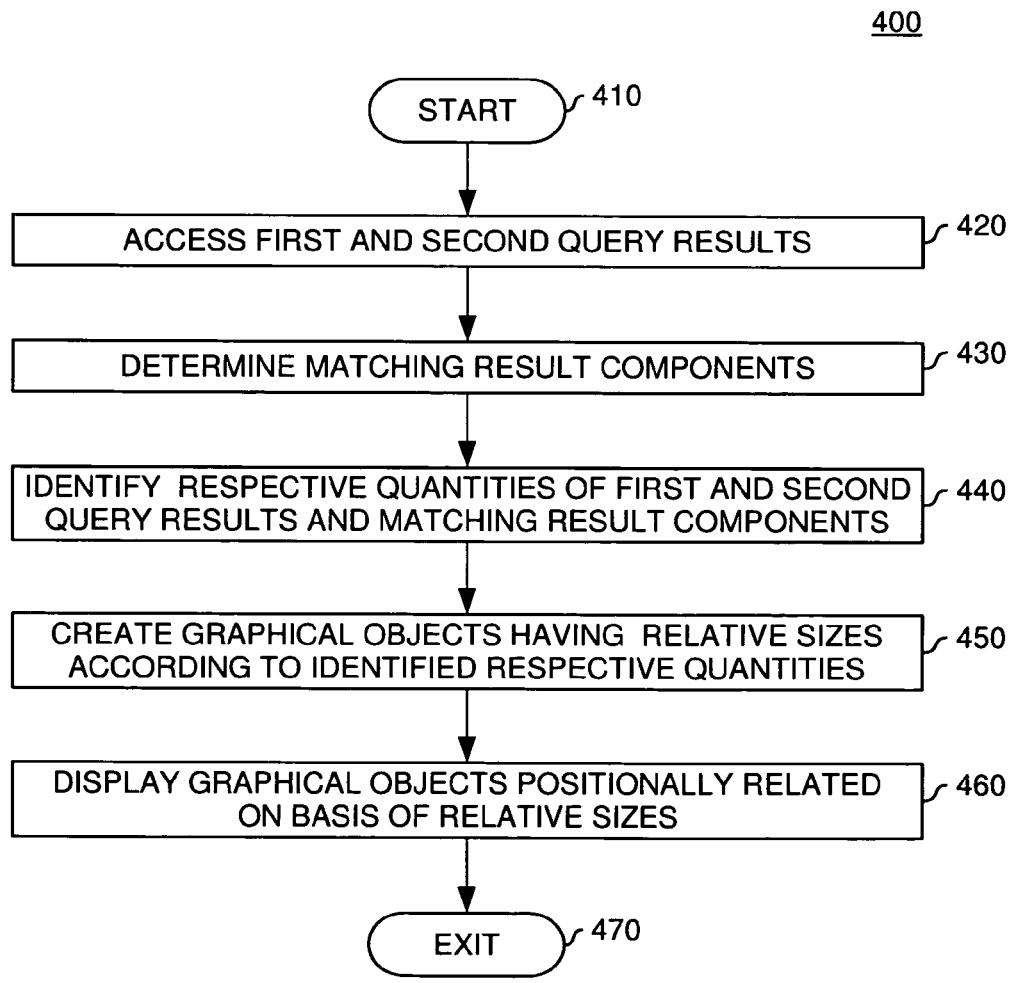
FIG. 4 is a flow chart illustrating a method for graphically representing relationships between different query results in one embodiment.

Referring now to FIG. 4, one embodiment of a method 400 for graphically representing a relationship between a first query result (e.g., query result 152 of FIG. 1) and a second query result (e.g., query result 154 of FIG. 1) is shown. At least part of the steps of method 400 can be performed using a relationship manager (e.g., relationship manager 170 of FIG. 1), a query manager (e.g., query manager 140 of FIG. 1) and/or a user interface (e.g., user interface 130 of FIG. 1). Method 400 starts at step 410.

At step 420, the relationship manager accesses the first and second query results. In one embodiment, the first query result is obtained after execution of a first query (e.g., query 112 of FIG. 1) and the second query result is obtained after execution of a second query (e.g., query 114 of FIG. 1). By way of example, the first and second queries can be created by a user using the user interface and previously defined queries. An exemplary method for creating a query using previously defined queries is described below with reference to FIGS. 6-12. According to another aspect, the user may select the first and second query results from a result repository (e.g., result repository 150 of FIG. 1) using the user interface. The first and second query results are then transmitted to the relationship manager.

Furthermore, in one embodiment the user can select, at step 420, a focus on a result field of a given selected query result. For instance, assume the illustrative SQL query of Table IV below which exemplifies a query "QUERY 4". By way of illustration, the exemplary query of Table IV is defined using SQL. However, any other language may be used to advantage.

TABLE IV

EXEMPLARY SQL "QUERY 4"

| | |
|---|---|
| 001 | SELECT PID,Test1 |
| 002 | FROM Demographic, Test |
| 003 | WHERE Demographic.PID = Test.PID |

By way of example, the exemplary SQL query of Table IV is defined to select information from the "PID" column of the "Demographic" table and a "Test1" column (line 1) of a "Test" database table (line 002). More specifically, the SQL query of Table IV is defined to gather information from both database tables with respect to data records, which are identified in both database tables by equal identifiers "Demographic.PID=Test.PID" (line 003). Assume now that after execution of the exemplary SQL query of Table IV a query result containing five data records is obtained. An exemplary query result is illustrated in Table V below.

TABLE V

EXEMPLARY RESULT OF "QUERY 4"

| 001 | PID | Test1 |
|---|---|---|
| 002 | 1 | 45 |
| 003 | 1 | 63 |
| 004 | 2 | 10 |
| 005 | 2 | 34 |
| 006 | 2 | 35 |

By way of example, the exemplary query result of Table V includes two result fields, i.e., "PID" and "Test1" (line 001). The exemplary query result indicates that for an individual which is identified by PID "1" two different test values "45" (line 002) and "63" (line 003) have been determined. For an individual which is identified by PID "2" three different test values have been determined: "10" (line 004), "34" (line 005 and "35" (line 006). Thus, while the exemplary query result includes five data records, these data records are only related to two different individuals. Consequently, if the user selects a focus on the "PID" result field, the number of different data records which can be counted in the exemplary query result is two. If, however, the user selects a focus on the "Test1" result fields, five different data records can be counted. In other words, the focus may influence further analysis of the given query result in subsequent steps of method 400.

At step 430, the relationship manager determines matching result components from the first and second query results. In other words, the relationship manager determines result components which are included in both query results. For instance, in the given example of "QUERY 1" of Table I and "QUERY 2" of Table II above, the matching result components are result components which simultaneously satisfy the query conditions of "QUERY 1" and "QUERY 2". More specifically, in the given example the matching result components are formed of all results obtained from the database table "Demographic" (line 002 of Tables I and II) for individuals having an Age ("Age>50") of 50 years and more (line 003 of Table) that have the gender ("Gender") 'M', i.e., male (line 003 of Table II) and an associated identifier "PID" equal to "1004" (line 004 of Tables I and II).

At step 440, the relationship manager determines a first quantity representative of the first query result, a second quantity representative of the second query result, and a third quantity representative of the matching result components. To this end, the relationship manager may count a number of data records contained in the first query result, a number of data records contained in the second query result, and a number of matching data records contained in the matching result components.

At step 450, the relationship manager creates a first graphical object representative of the first query result and a second graphical object representative of the second query result. In one embodiment, the graphical objects are shapes, such as geometrical shapes including circles, rectangles or triangles. In other embodiments the graphical objects are non-geometric. The shapes are provided with relative sizes which are defined on the basis of the first and second quantities.

At step 460, the graphical objects are displayed in the user interface. The displayed graphical objects are positionally related on the basis of the determined matching result components. More specifically, the displayed graphical objects are positionally related on the basis of the third quantity which is representative of the matching result components. Positionally relating query result representative graphical objects is described below with reference to FIGS. 5A-B. Method 400 then exits at step 470.

Figure 5A:
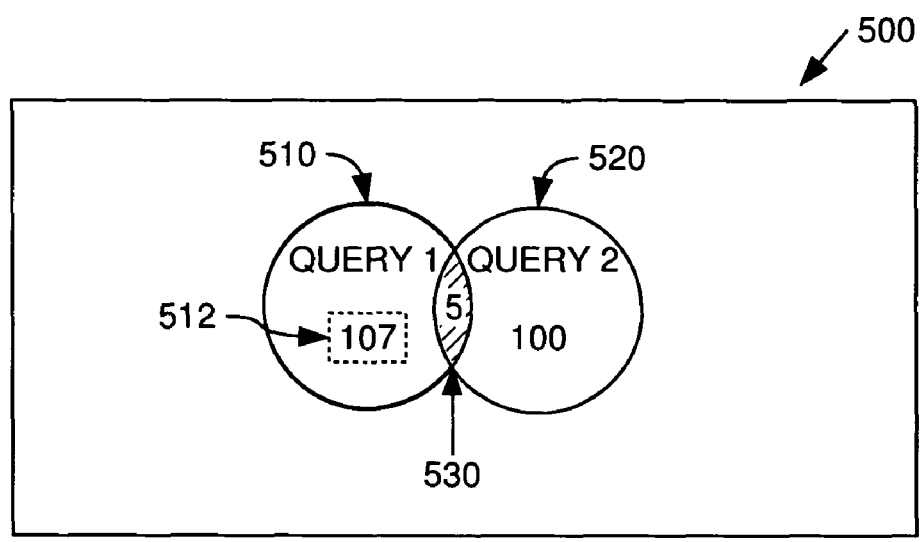
FIGS. 5A-5B are illustrative user interfaces for graphically displaying relationships between different query results in one embodiment.

Referring now to FIG. 5A, an exemplary user interface 500 (e.g., result area 132 of user interface 130 of FIG. 1) displaying positionally related graphical objects is shown. The user interface 500 illustratively includes two graphical objects 510 and 520. By way of example, assume that the graphical object 510 is representative of a query result obtained upon execution of "QUERY 1" of Table I above and the graphical object 520 is representative of a query result obtained upon execution of "QUERY 2" of Table II above.

Illustratively, the graphical objects 510 and 520 are circles. However, it should be noted that the graphical objects 510-520 can be represented using any suitable shapes, including other geometrical shapes such as rectangles and polygons or even non-geometrical shapes. Furthermore, it should be noted that the user interface 500 can be configured for displaying any suitable schematic diagram adapted for illustrating relationships between different graphical objects representative of corresponding query results, such as a Venn diagram.

According to one aspect, the graphical objects 510-520 have relative sizes which are determined on the basis of quantities which, in turn, are representative of the corresponding query results. For instance, assume that the query result corresponding to the graphical object 510 includes one hundred and seven result components and that the query result corresponding to the graphical object 520 includes only one hundred result components. More specifically, assume that in the given example one hundred and seven data records are obtained from the database table "Demographic" as query result for "QUERY 1" of Table I, and that one hundred data records are obtained from the database table "Demographic" as query result for "QUERY 2" of Table II. Accordingly, the graphical object 510 has a relative size which is slightly bigger than the relative size of the graphical object 520 for indicating that the number of data records contained in the query result for "QUERY 1" is bigger than the number of data records contained in the query result for "QUERY 2".

Furthermore, in one embodiment the graphical objects 510 and 520 are positionally related for illustrating the relationship between the query results of "QUERY 1" and "QUERY 2". In the given example, assume that the query results of "QUERY 1" and "QUERY 2" contain five matching result components. Accordingly, respective portions of the graphical objects 510 and 520 are overlapping one another in the user interface 500 for illustrating the matching result components schematically. More specifically, the positionally related graphical objects 510 and 520 define an overlapping region 530, non-overlapping regions defined by the non-overlapping portions of the graphical objects 510 and 520 and the unoccupied region in the user interface 500. In the given example, the unoccupied region in the user interface 500 represents all components of the "Demographic" table which are not included in either of the query results. The overlapping region 530 represents the matching result components of the query results of "QUERY 1" and "QUERY 2". Accordingly, the overlapping region 530 is illustrated having a small relative size compared to the relative sizes of the non-overlapping regions defined by the graphical objects 510 and 520. Accordingly, it is understood that the relative size of the overlapping region 530 increases with the number of matching result components.

According to one aspect, the size of each region defined by the graphical objects 510 and 520 in the user interface 500 is calculated proportionally to a corresponding actual quantity which is representative of the region. Furthermore, each region can be provided with an indication of the corresponding quantity. By way of example, the graphical object 510 illustratively includes an indication 512 which represents the number of data records contained in the query result for "QUERY 1". However, it should be noted that display of such indications and the granularity of display can be defined according to user preferences and/or system settings. For instance, the non-overlapping portion of the graphical object 510 may contain the indication 512 and, furthermore, an indication of a number of data records which are only included in the query result for "QUERY 1", but not in the query result for "QUERY 2".

Figure 5B:
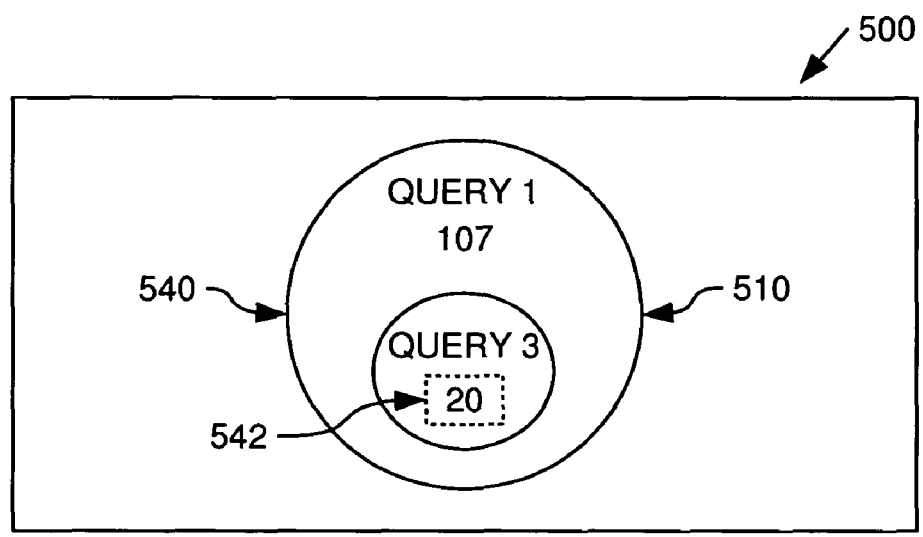

In FIG. 5B, the exemplary user interface 500 of FIG. 5A graphically represents the relationship between the query result represented by the graphical object 510 and another query result represented by a graphical object 540. By way of example, assume that the graphical object 540 is representative of a query result obtained upon execution of "QUERY 3" of Table III above.

Illustratively, FIG. 5B exemplifies a case where all result components of "QUERY 3" of Table III above are included in the query result of "QUERY 1". Specifically, FIG. 5B assumes that the query result of "QUERY 3" includes twenty result components, as indicated by an indication 542. As all result components of the query result of "QUERY 3" are contained in the query result of "QUERY 1", the graphical object 540 is illustrated inside the graphical object 510. The size of the graphical object 540 is a fraction of the size of the graphical object 510 which is determined on the basis of the relation between the underlying quantities of the corresponding query results.

However, it should be noted that the illustrated relationship between the query result of "QUERY 3" and the query result of "QUERY 1" may change if a user-selected or application-specific focus on one of the query results changes. For simplicity, a corresponding example is described in the following with reference to the exemplary query result of "QUERY 4" (Table V) and an exemplary query result of a "QUERY 5" described in Table VI below. Accordingly, assume that after execution of "QUERY 5" a query result containing five data records is obtained. An exemplary query result is illustrated in Table VI below.

TABLE VI

EXEMPLARY RESULT OF "QUERY 5"

| 001 | PID | Test1 |
|-----|-----|-------|
| 002 | 1   | 46    |
| 003 | 1   | 52    |
| 004 | 2   | 54    |
| 005 | 2   | 33    |
| 006 | 2   | 37    |

By way of example, the exemplary query result of Table VI includes two result fields, i.e., "PID" and "Test1" (line 001). The exemplary query result indicates that for an individual which is identified by PID "1" two different test values "46" (line 002) and "52" (line 003) have been determined. For an individual which is identified by PID "2" three different test values have been determined: "54" (line 004), "33" (line 005), and "37" (line 006). Assume now that the user selects a focus on the "PID" result field of the query results in Tables V and VI. As both "PID" result fields contain identical values, the determined degree of similarity between the two query results would correspond to 100% similarity. If, however, the user selects a focus on the "Test1" result fields, a degree of similarity corresponding to 0% is determined, as both result fields contain only differing values. Moreover, if the result fields "Test1" would be represented as classification fields, e.g., using classifications of the values such as 0-30, 31-60 and 61-100, a degree of similarity corresponding to 33% can be determined. More specifically, the "Test1" result field of Table V includes one value in the classification 0-30 (i.e., "10" in line 004), three values in the classification 31-60 (i.e., "45", "34" and "35" in lines 002, 005 and 006, respectively) and one value in the classification 61-100 (i.e., "63" in line 003). However, the "Test1" result field of Table VI includes no values in the classifications 0-30 and 61-100, but five values in the classification 31-60 (i.e., "46", "52", "54", "33" and "37" in lines 002-006, respectively). In other words, the focus may influence analysis of different query results with respect to matching result components. Accordingly, graphically representing relationships between the different query results may depend on a selected focus.

As was noted above, a given query can be created using previously defined queries using a user interface. Furthermore, it was noted that a user may select query results from a result repository using a user interface. Selecting query results from a query repository and/or creating a query using previously defined queries is described below with reference to FIGS. 6-12.

Figure 6:
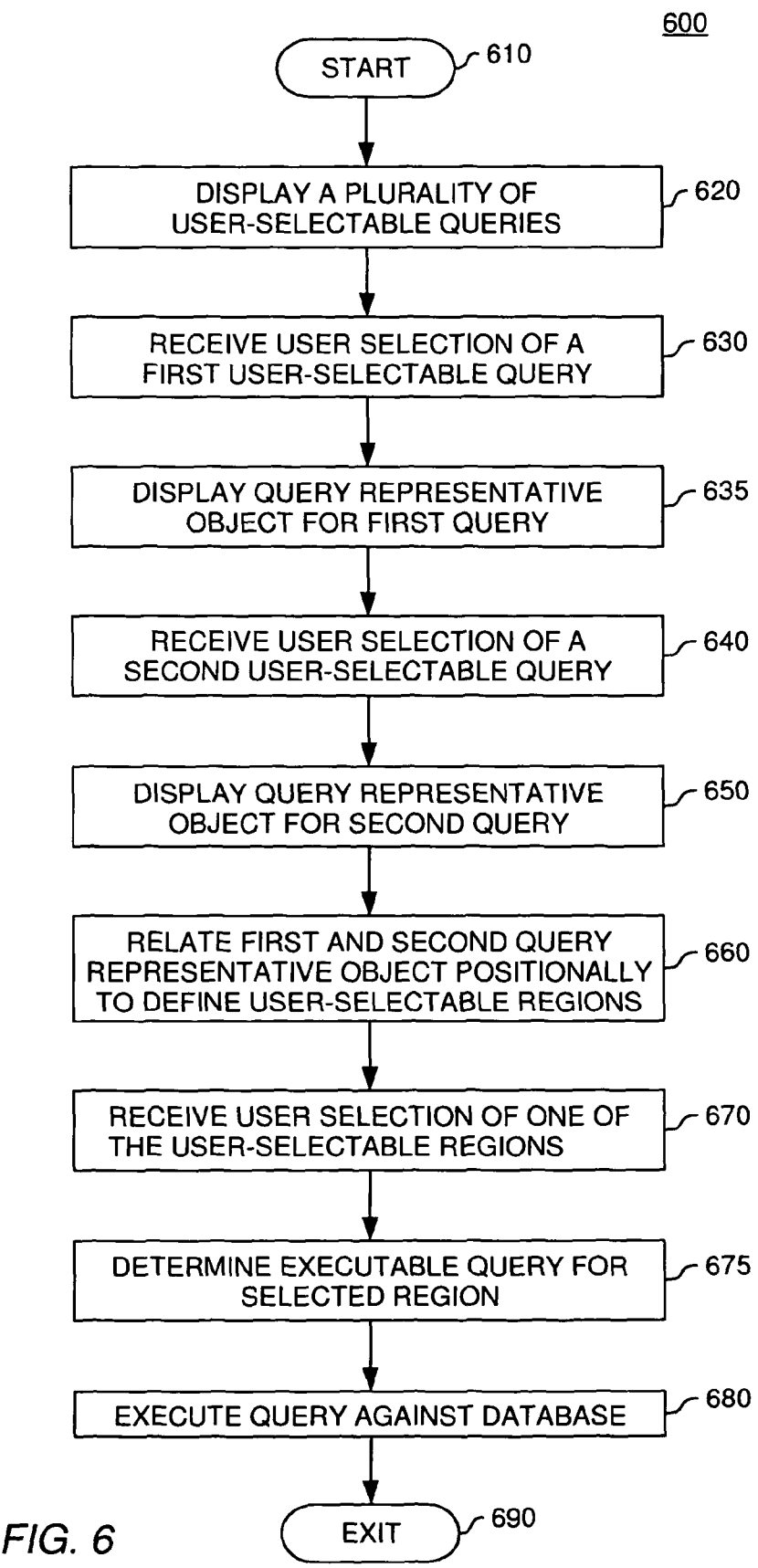
FIG. 6 is a flow chart illustrating a method for managing creation of a query in one embodiment.

Referring now to FIG. 6, one embodiment of a method 600 for creating a query using previously defined queries is shown. At least part of the steps of method 600 can be performed using a user interface (e.g., user interface 130 of FIG. 1) and/or a query manager (e.g., query manager 140 of FIG. 1). Method 600 starts at step 610.

At step 620, a plurality of user-selectable queries is displayed. For instance, the queries 112, 114 and 116 of FIG. 1 are displayed as user-selectable queries in a selection area of the user interface. At step 630, a user selection of a first query from the user-selectable queries is received. An exemplary user interface illustrating selection of a first query is described below with reference to FIG. 7.

At step 635, a first graphical object representative of the first query is displayed. An exemplary user interface illustrating display of a first graphical object is described below with reference to FIG. 8.

At step 640, a user selection of a second query from the user-selectable queries is received. At step 650, a second graphical object representative of the second query is displayed together with the first graphical object. An exemplary user interface illustrating selection and display of a second graphical object is described below with reference to FIG. 9. In one embodiment, after selection of the first and second queries, a method similar to method 200 of FIG. 2 is performed for graphically representing relationships between the first and second queries.

At step 660, the first and second graphical objects are positionally related to define a plurality of user-selectable regions. The user-selectable regions correspond to the regions defined by the first and second graphical objects, i.e., the overlapping region, non-overlapping regions and the unoccupied region in the user interface. Each region corresponds to a different executable query. Exemplary user interfaces illustrating different user-selectable regions are described below with reference to FIGS. 9-12.

In one embodiment, positionally relating the first and second graphical objects is performed in response to user input. Alternatively, the graphical objects can be related positionally according to predefined user settings without user intervention. For instance, the graphical objects can be related positionally such that each graphical object defines an overlapping portion with each other graphical object or with at least one other graphical object.

At step 670, a user selection of one of the user-selectable regions is received. At step 675, an executable query corresponding to the selected region is determined. Selection of a user-selectable region and determination of the executable query is described in more detail below with reference to FIGS. 9-11, by way of example. In one embodiment, the executable query can be stored persistently. For instance, the executable query can be stored in the query repository 110 of FIG. 1 and thus becomes one of predefined defined queries 112, 114 and 116 available for selection. Furthermore, execution of the executable query can be scheduled according to user preferences.

At step 680, the executable query is executed against one or more databases (e.g., database 160 of FIG. 1). Method 600 then exits at step 690. In one embodiment, after execution of the executable query, the first and second queries are also executed and display of the graphical objects in the user interface is updated on the basis of the obtained query results. In one embodiment, updating the display includes updating the spatial arrangement of the positionally related graphical objects according to method 400 of FIG. 4.

Figure 7:
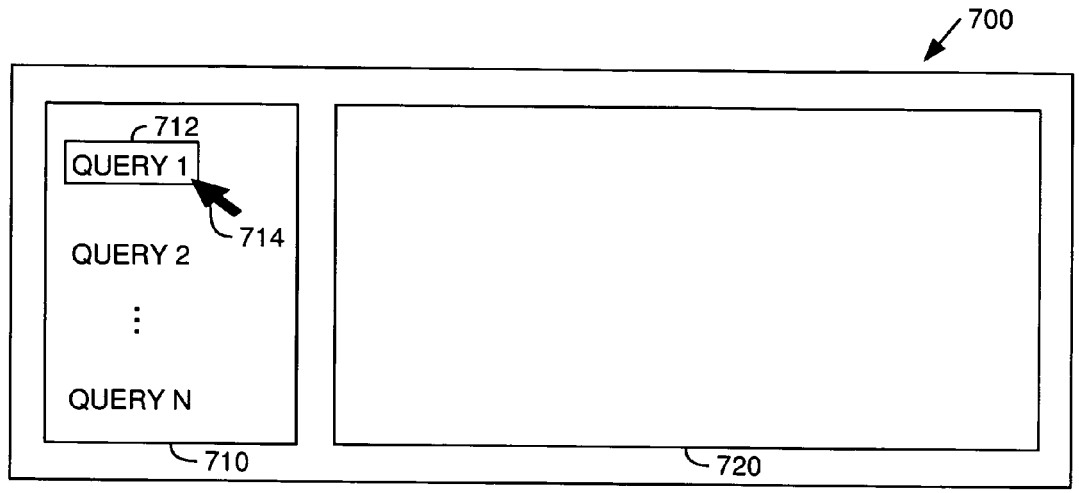
FIGS. 7-12 are illustrative user interfaces for creating queries in one embodiment.

Referring now to FIG. 7, an illustrative user interface 700 is shown. By way of example, the user interface 700 includes a selection area 710 and a representation area 720 (e.g., user interface 500 of FIG. 5A-B). The representation area 720 is configured for displaying graphical objects representative of selected queries. More specifically, the representation area 720 is configured for displaying graphical objects representative of query results which, in turn, are representative of the selected queries. The selection area 710 is configured for displaying a plurality of user-selectable queries (e.g., queries 112-116 of FIG. 1). The selection area 710 is further configured for allowing users to select queries from the displayed plurality of user-selectable queries. To select a query, a user may use any suitable input device, such as a keyboard or a pointing device. By way of example, a mouse cursor 714 (hereinafter referred to as cursor) is shown at a position over a query 712 "QUERY 1". In one embodiment, the cursor 714 is positioned over the query 712 "QUERY 1" in response to user manipulation of a pointing device, such as a computer mouse, a light pen, or even a human finger in the case of a touch screen. For the following explanations, it is assumed that the user uses a computer mouse for moving and positioning the cursor 714 in the user interface 700.

Figure 8:
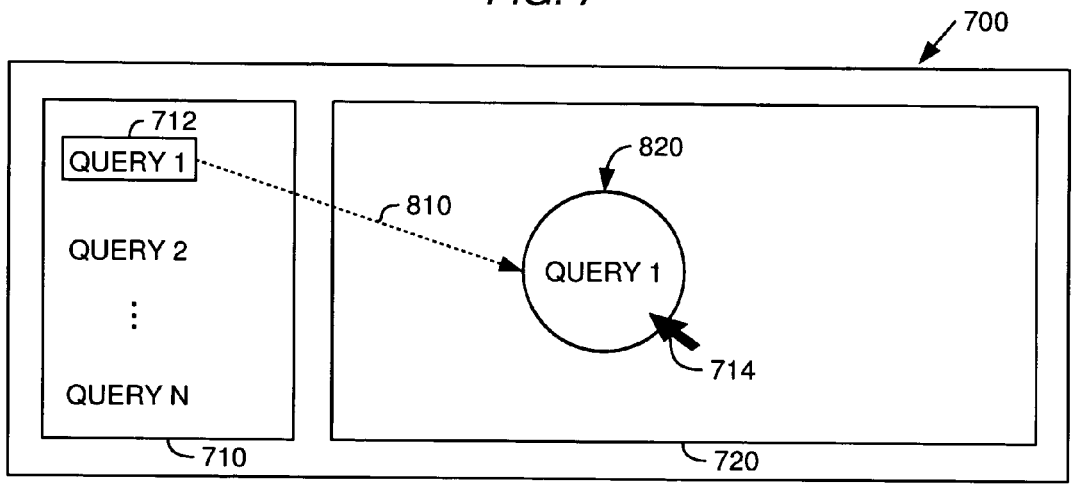

Illustratively, the user selects the query 712 (i.e., "QUERY 1" of Table I) using the computer mouse. Referring now to FIG. 8, the illustrative user interface 700 is shown after selection of the query 712 "QUERY 1". Illustratively, the user interface 700 includes a graphical object 820 representative of a query result which can be obtained upon execution of the selected query 712 "QUERY 1". The graphical object 820 is displayed in the representation area 720. In one embodiment, the graphical object 820 is displayed in response to a drag-and-drop operation on the selected query 712 "QUERY 1". More specifically, as illustrated in FIG. 7, the user can position the cursor 714 over the user-selectable query 712 "QUERY 1". The user may then push the left mouse button, for instance, to select the query 712 "QUERY 1" and drag the selected query 712 "QUERY 1" to the representation area 720 (as illustrated by dashed arrow 810). Then, the user may drop the selected query 712 "QUERY 1" on the representation area 720 to cause creation and display of the graphical object 820. Subsequently, the user can select one or more other queries from the user-selectable queries, as illustrated in FIG. 9.

Figure 9:
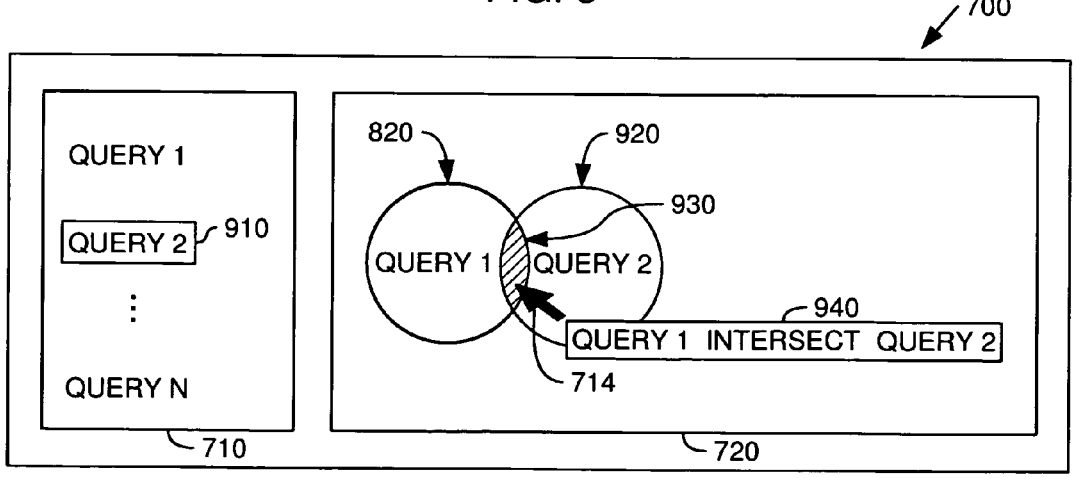

Referring now to FIG. 9, the illustrative user interface 700 is shown after selection of another query, i.e., query 910 (i.e., "QUERY 2" of Table II) from the selection area 710. Accordingly, a graphical object 920 representative of a query result which can be obtained upon execution of the selected query 910 "QUERY 2" is displayed in the representation area 720 together with the graphical object 820.

According to one aspect, the representation area 720 defines a Venn diagram, wherein the graphical objects 820 and 920 are circles of equal sizes. However, it should be noted that graphical objects having arbitrary shapes are broadly contemplated, including geometrical objects having geometrical shapes such as rectangles or triangles. Moreover, the representation area 720 can be any suitable schematic diagram illustrating relationships between different graphical objects representative of corresponding queries. Specifically, the representation area 720 can be any diagram allowing the user to positionally relate different graphical objects.

By way of example, the graphical objects 820 and 920 are positionally related so that respective portions of the graphical objects 820 and 920 are overlapping one another as described above with respect to FIG. 5A. Accordingly, the positionally related graphical objects 820 and 920 define a plurality of regions. Each defined region is user-selectable and corresponds to an executable query. By way of example, using the representation area 720 of FIG. 9 which includes the graphical objects 820 and 920, fourteen different user-selectable regions are defined. In other words, using the representation area 720, fourteen different queries can be created, as illustrated in the following with reference to FIGS. 9-12.

In one embodiment, when the cursor 714 hovers over one of the user-selectable regions, a hover text message is displayed proximate the cursor 714. The hover text message describes the executable query corresponding to the user-selectable region. Illustratively, the cursor 714 is positioned over a user-selectable region 930 defined by the overlapping region of the graphical objects 820 and 920. Accordingly, a hover text message 940 describing the executable query corresponding to the user-selectable region 930 is displayed. In the given example the user-selectable region 930 is a geometrical intersection of the graphical objects 820 and 920. Thus, the hover text message 940 may include descriptive language indicating that the executable query represents an intersection of the selected queries "QUERY 1" and "QUERY 2" corresponding to the graphical objects 820 and 920, respectively. In a particular embodiment, the hover text message is query language (e.g., SQL) corresponding to the executable query.

The user can select the user-selectable region 930 for execution of the executable query against data (e.g., data 162 of FIG. 1) of one or more databases (e.g., database 160 of FIG. 1). For instance, if "QUERY 1" is configured to determine all patients in a hospital that suffer from Parkinson's disease and "QUERY 2" is configured to determine all patients in the hospital that suffer from Alzheimer's disease, the user may wish to determine all patients in the hospital that suffer from Parkinson's and Alzheimer's disease. To this end, the user may click on the user-selectable region 930 using the computer mouse. In one embodiment, the selected region 930 is highlighted as feedback to the user in response to a selection thereof. Illustratively, the selected region 930 is hatched.

In response to selection of the region 930, the executable query is determined. More specifically, each of the selected queries "QUERY 1" and "QUERY 2" may include a plurality of query conditions specifying selection criteria for data to be returned. The query conditions are logically combined by Boolean operators, such as Boolean AND and/or OR operators. In the given example, the query conditions of the executable query are defined by the intersection of the query conditions of the selected queries "QUERY 1" and "QUERY 2". Therefore, the query conditions of the selected queries "QUERY 1" and "QUERY 2" must be logically combined using an AND operator to determine the intersection thereof. In other words, the query conditions of the executable query could be logically defined by:

(Query conditions of QUERY 1) AND (Query conditions of QUERY 2) Through a process of Boolean algebra, these query conditions may then be simplified.

In one embodiment, the selected queries "QUERY 1" and "QUERY 2" are SQL queries. Accordingly, the intersection of the selected queries "QUERY 1" and "QUERY 2" can be determined using the INTERSECT statement of the SQL set operations. In other words, in SQL the executable query can be expressed as:

(QUERY 1) INTERSECT (QUERY 2)

The INTERSECT statement is used to merge query results obtained for the selected queries "QUERY 1" and "QUERY 2" into a single query result. Therefore, the structure of the individual query results of the selected queries "QUERY 1" and "QUERY 2" must be compatible. However, the selected queries "QUERY 1" and "QUERY 2" may return query results having different data elements. For instance, the query results may be represented in tabular form having different columns. Since only the executable query is executed, the columns in the query results of the selected queries "QUERY 1" and "QUERY 2" must match up to provide a meaningful result. Therefore, the query results of the selected queries "QUERY 1" and "QUERY 2" must be derived to use a common set of result columns for the query result of the executable query. Furthermore, if the INTERSECTION method is to be used, "QUERY 1" and "QUERY 2" may not remain unaltered because the INTERSECTION statement requires that both queries have matching result columns. By default, this is the overlapping set of result columns with an optional addition of any more columns the user chooses to select. This overlapping set would then become the column set of the query result for the executable query. If the INTERSECTION method is being used, the overlapping set would also become the output columns for both selected queries "QUERY 1" and "QUERY 2".

In the given example, the query conditions of "QUERY 1" of Table I and "QUERY 2" of Table II would be logically combined and simplified through a process of Boolean algebra to determine the query condition(s) of a resultant query (i.e., the resultant query corresponding to region 930). An exemplary resultant SQL query which is determined by logically combining the query conditions of the exemplary queries "QUERY 1" and "QUERY 2" is shown in Table VII below.

TABLE VII

EXEMPLARY RESULTANT SQL QUERY

| 001 | SELECT PID, Name, Age, Gender |
| 002 | FROM Demographic |
| 003 | WHERE Age > 50 AND Gender = 'M' |

As can be seen from line 003 of Table VII, the query condition of the exemplary resultant SQL query consists of the query conditions: (i) "AGE>50" of "QUERY 1" (Table I, line 003), and (ii) "Gender='M'" of "QUERY 2" (Table II, line 003), which are logically combined using a Boolean "AND" operator.

If the SQL INTERSECT statement is used as described above to merge query results obtained for the selected exemplary queries "QUERY 1" and "QUERY 2" into a single query result, the illustrative resultant INTERSECT query shown in Table VIII below is obtained.

TABLE VIII

EXEMPLARY RESULTANT INTERSECT QUERY

| 001 | SELECT PID, Name, Age, Gender |
| 002 | FROM Demographic |
| 003 | WHERE Age > 50 |
| 004 | INTERSECT |
| 005 | SELECT PID, Name, Age, Gender |
| 006 | FROM Demographic |
| 007 | WHERE Gender = 'M' |

As can be seen from Table VIII, the exemplary resultant INTERSECT query consists of an intersection, "INTERSECT" (line 004), of "QUERY 1" (lines 001-003) and "QUERY 2" (lines 005-007). Illustratively, "QUERY 1" and "QUERY 2" include matching result columns. More specifically, the SELECT statement of "QUERY 1" (line 001 of Table I) includes the same result columns as the SELECT statement of "QUERY 2" (line 001 of Table II). Consequently, "QUERY 1" and "QUERY 2" have matching result columns in the exemplary resultant INTERSECT query of Table VIII (line 001 and 005) which represent an overlapping result set of both queries.

In the example above, the query conditions of the selected queries "QUERY 1" and "QUERY 2" are logically combined to produce a resultant combination query that includes conditions for both "QUERY 1" and "QUERY 2". However, it is also contemplated that the resultant combination query may include conditions only from either "QUERY 1" or "QUERY 2". For example, it may be determined that the result set of "QUERY 2" is wholly within the result set of "QUERY 1" (i.e., the result set of "QUERY 2" is a subset of the result set for "QUERY 1"). In this case, the resultant combination query would include conditions only from "QUERY 1". An exemplary embodiment where the result set of one query is a subset of another query is described above by way of example with reference to "QUERY 1" and "QUERY 3" in FIG. 5B.

As was noted above, the user may select any user-selectable region, or regions, defined by the graphical objects and the representation area in the user interface 700. Examples illustrating selection of user-selectable regions other than the intersection of two selected queries are described below with reference to FIGS. 10-11.

Figure 10:
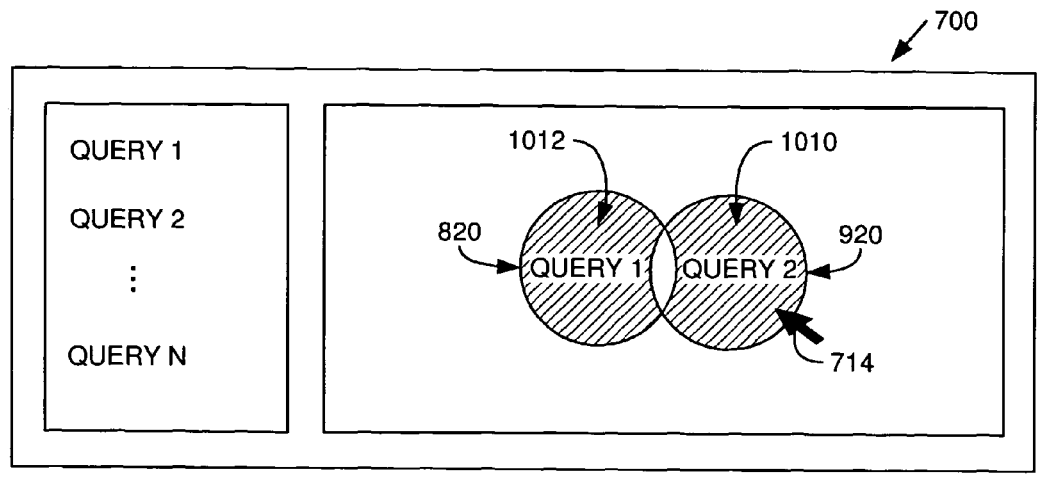

Referring now to FIG. 10, the illustrative user interface 700 is shown after selection of a user-selectable region defined by the non-overlapping regions of the graphical objects 820 and 920. In other words, the selected region (shown hatched) only includes a portion 1012 of the graphical object 820 and a portion 1010 of the graphical object 920 (hereinafter referred to as the selected region 1010-1012). By way of example, the selected region 1010-1012 can be selected using the cursor 714. To this end, the user may click on both user-selectable regions 820 and 920. According to one aspect, this results in a selection of both graphical objects and the intersection thereof. Then, the user may deselect the intersection region of the user-selectable regions 820 and 920 by clicking thereon such that only the selected region 1010-1012 remains selected.

In the example of FIG. 10, query conditions of an executable query corresponding to the selected region 1010-1012 consist of two parts: (i) first query conditions specifying selection criteria for portion 1012, and (ii) second query conditions specifying selection criteria for portion 1010. Using Boolean operators, the first query conditions can be expressed as:

(Query conditions of QUERY 1) AND (NOT (Query conditions of QUERY 2))

The second query conditions can be expressed as:

(NOT (Query conditions of QUERY 1)) AND (Query conditions of QUERY 2) The first and second query conditions are then logically combined using an OR operator to determine the query conditions of the executable query.

An exemplary resultant SQL query representing the selected region 1010-1012 which is determined by logically combining the query conditions of the exemplary queries "QUERY 1" (Table I) and "QUERY 2" (Table II) is shown in Table IX below.

TABLE IX

EXEMPLARY RESULTANT SQL QUERY

| | |
|---|---|
| 001 | SELECT PID, Name, Age, Gender |
| 002 | FROM Demographic |
| 003 | WHERE (Age > 50 AND Gender <> 'M') OR (Age <= 50 AND Gender = 'M') |

If the selected queries "QUERY 1" and "QUERY 2" are SQL queries, the executable query can be determined using the UNION and EXCEPT statements of the SQL set operations. In other words, in SQL the executable query can be expressed as:

((QUERY 1) EXCEPT (QUERY 2)) UNION ((QUERY 2) EXCEPT (QUERY 1))

An exemplary resultant SQL query representing the selected region 1010-1012 which is determined using the UNION and EXCEPT statements is shown in Table X below.

TABLE X

EXEMPLARY RESULTANT UNION AND EXCEPT QUERY

| | |
|---|---|
| 001 | (SELECT PID, Name, Age, Gender |
| 002 | FROM Demographic |
| 003 | WHERE Age > 50 |
| 004 | EXCEPT |
| 005 | SELECT PID, Name, Age, Gender |
| 006 | FROM Demographic |
| 007 | WHERE Gender = 'M' |
| 008 | ) |
| 009 | UNION |
| 010 | (SELECT PID, Name, Age, Gender |
| 011 | FROM Demographic |
| 012 | WHERE Gender = 'M' |
| 013 | EXCEPT |
| 014 | SELECT PID, Name, Age, Gender |
| 015 | FROM Demographic |
| 016 | WHERE Age > 50 |
| 017 | ) |

Figure 11:
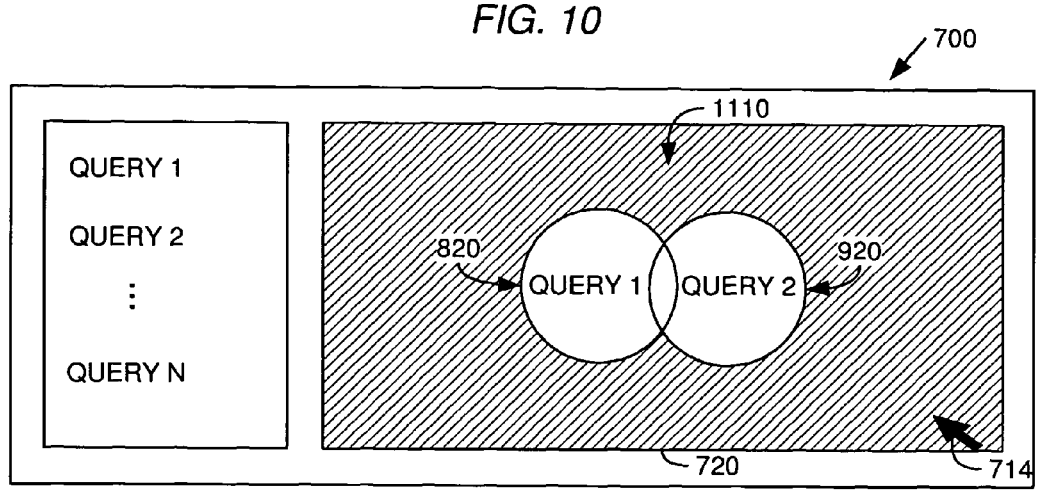

Referring now to FIG. 11, the illustrative user interface 700 is shown after selection of a user-selectable region 1110 that corresponds to the unoccupied region in the representation area 720. By way of example, the selected region 1110 (shown hatched) can be selected using the cursor 714. Using Boolean operators, the query conditions of the executable query corresponding to the selected region 1110 can be expressed as:

(NOT (Query conditions of QUERY 1)) AND (NOT (Query conditions of QUERY 2))

An exemplary resultant SQL query representing the selected region 1110 which is determined by logically combining the query conditions of the exemplary queries "QUERY 1" (Table I) and "QUERY 2" (Table II) is shown in Table XI below.

TABLE XI

EXEMPLARY RESULTANT SQL QUERY

| | |
|---|---|
| 001 | SELECT PID, Name, Age, Gender |
| 002 | FROM Demographic |
| 003 | WHERE (Age <= 50 AND Gender <> 'M') |

If the selected queries "QUERY 1" and "QUERY 2" are SQL queries, the executable query can be determined using the UNION and EXCEPT statements of the SQL set operations. In other words, in SQL the executable query can be expressed as:

QueryALL EXCEPT ((QUERY 1) UNION (QUERY 2))

where "QueryALL" represents a query that leads to a query result returning all queryable data represented by the representation area 720. For instance, this can be a query that selects the queryable data without any query conditions.

An exemplary resultant SQL query representing the selected region 1110 which is determined using the UNION and EXCEPT statements is shown in Table XII low.

TABLE XII

EXEMPLARY RESULTANT UNION AND EXCEPT QUERY

| | |
|---|---|
| 001 | SELECT PID, Name, Age, Gender |
| 002 | FROM Demographic |
| 003 | EXCEPT |
| 004 | (SELECT PID, Name, Age, Gender |
| 005 | FROM Demographic |
| 006 | WHERE Age > 50 |
| 007 | UNION |
| 008 | SELECT PID, Name, Age, Gender |
| 009 | FROM Demographic |
| 010 | WHERE Gender = 'M' |
| 011 | ) |

It should be noted that the user-selectable regions according to FIGS. 9-11 have been defined by only two graphical objects. However, in various embodiments the user may select more than two queries from the user-selectable queries. Thus, more than two graphical objects may be displayed in the representation area, whereby more user-selectable regions can be defined in the representation area. An exemplary embodiment illustrating selection of three queries is illustrated in FIG.

Figure 12:
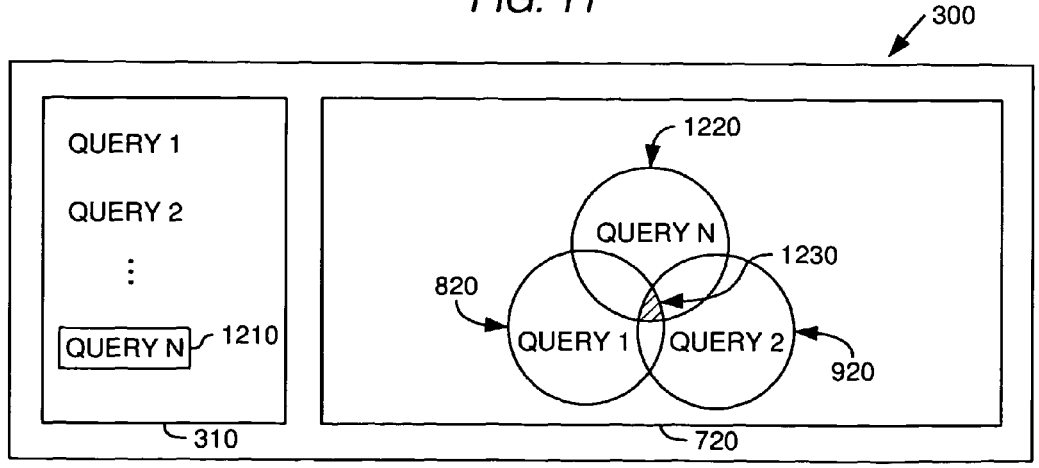

Referring now to FIG. 12, the illustrative user interface 700 is shown after selection of still another query, i.e., query 1210 "QUERY N" from the selection area 710. Accordingly, a graphical object 1220 representative of the selected query 1210 "QUERY N" is displayed in the representation area 720 together with the graphical objects 820 and 920. By way of example, the graphical objects 820, 920 and 1220 are positionally related so that respective portions of the graphical objects 820, 920 and 1220 are overlapping one another. Accordingly, the positionally related graphical objects 820, 920 and 1220 define an overlapping region 1230 and non-overlapping regions defined by the non-overlapping portions of the graphical objects 820, 920, 1220 and the unoccupied region in the representation area 720.

While the foregoing is directed to embodiments of the present invention, other and further embodiments of the invention may be devised without departing from the basic scope thereof, and the scope thereof is determined by the claims that follow.

What is claimed is:

1. A method for graphically representing a relationship between a first and a second query, comprising:
    selecting one or more elements from the first and second queries;
    calculating, by operation of one or more computer processors and on the basis of the selected elements, a degree of similarity between the first and second queries; and
    displaying, on a display device, a first query object representative of the first query and a second query object representative of the second query in a user interface, the first and second query objects being positionally arranged on the basis of the calculated degree of similarity, wherein the positional arrangement reflects the relationship between the first and second queries and wherein the first query object query and the second query object are graphical objects.

2. The method of claim 1, wherein the first and second query objects are shapes.

3. The method of claim 1, wherein the first and second query objects are connected to each other via a connector, the connector being indicative of the degree of similarity and describing for the selected elements at least one of:
    (i) selected elements contained in the first and second queries; and
    (ii) selected elements contained only in either of the first and second queries.

4. The method of claim 1, wherein the degree of similarity is defined by a relative distance between the first and second query objects in the user interface.

5. The method of claim 1, wherein calculating the degree of similarity comprises:
    weighting the selected elements.

6. The method of claim 5, wherein weighting the selected elements is performed using at least one of:
    (i) user-specific predefined weights;
    (ii) application-specific predefined weights;
    (iii) dynamically calculated weights; and
    (iv) statistically inferred weights.

7. The method of claim 5, wherein the selected elements are selected of one of: (i) condition fields of query conditions from the first and second queries; (ii) condition parameters of query conditions from the first and second queries; and (iii) result fields of the first and second queries.

8. The method of claim 1, wherein the selected elements are condition fields of query conditions from the first and second queries.

9. The method of claim 8, wherein calculating the degree of similarity comprises:
    counting all condition fields included only in either of the first and second queries.

10. The method of claim 1, wherein the selected elements are condition parameters of query conditions from the first and second queries.

11. The method of claim 1, wherein the selected elements are result fields of the first and second queries.

12. The method of claim 11, wherein calculating the degree of similarity comprises:
    counting all result fields included only in either of the first and second queries.

13. A method for graphically representing relationships between a first query and a second query, the method comprising:
    comparing elements of the first and second queries to determine matching elements of the first and second queries, wherein the matching elements comprise at least one of a condition field and a condition parameter;
    displaying, in a user interface on a display device, at least a first graphical object representative of the first query and a second graphical object representative of the second query; and
    positionally relating the graphical objects in the user interface on the basis of the determined matching elements, wherein the positional relationship of the graphical objects reflects a degree of similarity between the first query and second query, wherein the comparing and positionally relating are done by a relationship manager executed by one or more computer processors.

14. The method of claim 13, wherein the graphical objects are shapes, the method further comprising:
    determining a first quantity representative of the first query and a second quantity representative of the second query;
    determining a third quantity representative of the matching elements; and
    defining relative sizes for the shapes on the basis of the first, second and third quantities.

15. The method of claim 13, wherein positionally relating the graphical query objects comprises defining:
    (i) an overlapping region representing the matching elements, the overlapping region being defined by overlapping portions of the graphical objects;
    (ii) non-overlapping regions defined by the non-overlapping portions of the graphical objects; and
    (iii) one or more unoccupied regions defined by portions of the user interface which are not contained in the overlapping region or the non-overlapping regions.

16. The method of claim 13, further comprising, prior to displaying the graphical objects:
    displaying a plurality of user-selectable queries in the user interface; and
    receiving a user-selection of at least a first and a second user-selectable query, wherein the first graphical object is displayed for the first selected query and the second graphical object is displayed for the second selected query.

17. A computer-readable storage medium containing a program which, when executed by a processor, performs a process for graphically representing a relationship between a first and a second query, the process comprising:
    selecting one or more elements from the first and second queries;
    calculating, on the basis of the selected elements, a degree of similarity between the first and second queries; and
    displaying a first query object representative of the first query and a second query object representative of the second query in a user interface, the first and second query objects being positionally arranged on the basis of the calculated degree of similarity, wherein the positional arrangement reflects the relationship between the first and second queries and wherein the first query object query and the second query object are graphical objects.

18. The computer-readable storage medium of claim 17, wherein the first and second query objects are shapes.

19. The computer-readable storage medium of claim 17, wherein the first and second query objects are connected to each other via a connector, the connector being indicative of the degree of similarity and describing for the selected elements at least one of:
- (i) selected elements contained in the first and second queries; and
- (ii) selected elements contained only in either of the first and second queries.

20. The computer-readable storage medium of claim 17, wherein the degree of similarity is defined by a relative distance between the first and second query objects in the user interface.

21. The computer-readable storage medium of claim 17, wherein calculating the degree of similarity comprises:
weighting the selected elements.

22. The computer-readable storage medium of claim 21, wherein weighting the selected elements is performed using at least one of:
- (i) user-specific predefined weights;
- (ii) application-specific predefined weights;
- (iii) dynamically calculated weights; and
- (iv) statistically inferred weights.

23. The computer-readable storage medium of claim 21, wherein the selected elements are selected of one of: (i) condition fields of query conditions from the first and second queries; (ii) condition parameters of query conditions from the first and second queries; and (iii) result fields of the first and second queries.

24. The computer-readable storage medium of claim 17, wherein the selected elements are condition fields of query conditions from the first and second queries.

25. The computer-readable storage medium of claim 24, wherein calculating the degree of similarity comprises:
counting all condition fields included only in either of the first and second queries.

26. The computer-readable storage medium of claim 17, wherein the selected elements are condition parameters of query conditions from the first and second queries.

27. The computer-readable storage medium of claim 17, wherein the selected elements are result fields of the first and second queries.

28. The computer-readable storage medium of claim 27, wherein calculating the degree of similarity comprises:
counting all result fields included only in either of the first and second queries.

29. A computer-readable storage medium containing a program which, when executed by a processor, performs a process for graphically representing relationships between a first query and a second query, the process comprising:
comparing the first and second queries to determine matching elements of the first and second queries, wherein the matching elements comprise at least one of a condition field and a condition parameter;
displaying, in a user interface, at least a first graphical object representative of the first query and a second graphical object representative of the second query; and
positionally relating the graphical objects on the basis of the determined matching elements, wherein the positional relationship of the graphical objects reflects a degree of similarity between the first query and second query.

30. The computer-readable storage medium of claim 29, wherein the graphical objects are shapes, the process further comprising:
determining a first quantity representative of the first query and a second quantity representative of the second query;
determining a third quantity representative of the matching elements; and
defining relative sizes for the shapes on the basis of the first, second and third quantities.

31. The computer-readable storage medium of claim 29, wherein positionally relating the graphical query objects comprises defining:
- (i) an overlapping region representing the matching elements, the overlapping region being defined by overlapping portions of the graphical objects;
- (ii) non-overlapping regions defined by the non-overlapping portions of the graphical objects; and
- (iii) one or more unoccupied regions defined by portions of the user interface which are not contained in the overlapping region or the non-overlapping regions.

32. The computer-readable storage medium of claim 30, wherein the process further comprises:
displaying an indication of the first, second and third quantities in the respective overlapping and non-overlapping regions.

33. The computer-readable storage medium of claim 29, wherein the process further comprises, prior to displaying the graphical objects:
displaying a plurality of user-selectable queries in the user interface; and
receiving a user-selection of at least a first and a second user-selectable query, wherein the first graphical object is displayed for the first selected query and the second graphical object is displayed for the second selected query.

34. A computer system comprising:
one or more computer readable storage mediums;
a user interface;
a first and a second query; and
a relationship manager configured for:
selecting one or more elements from the first and second queries;
calculating, on the basis of the selected elements, a degree of similarity between the first and second queries; and
displaying a first query object representative of the first query and a second query object representative of the second query in the user interface, the first and second query objects being positionally arranged on the basis of the calculated degree of similarity, wherein the positional arrangement reflects the relationship between the first and second queries, and wherein the first query object query and the second query object are graphical objects; wherein the relationship manager is stored on the one or more computer readable storage mediums, and is executable by one or more processors.

* * * * *